United States Patent
Kim et al.

(10) Patent No.: US 7,146,552 B2
(45) Date of Patent: Dec. 5, 2006

(54) APPARATUS AND METHOD FOR PERFORMING CODING AND RATE MATCHING IN A CDMA MOBILE COMMUNICATION SYSTEM

(75) Inventors: Hun-Kee Kim, Seoul (KR); Yong-Suk Moon, Songnam (KR); Sang-Hwan Park, Suwon (KR); Jae-Seung Yoon, Songnam (KR); Yong-Jun Kwak, Yongin (KR); Su-Won Park, Taejon-Kwangyok (KR); Jae-Hoon Chung, Taejon-Kwangyok (KR)

(73) Assignee: Samsung Electronics Co., Ltd. (KR)

( * ) Notice: Subject to any disclaimer, the term of this patent is extended or adjusted under 35 U.S.C. 154(b) by 344 days.

(21) Appl. No.: 10/273,948

(22) Filed: Oct. 18, 2002

(65) Prior Publication Data

US 2003/0171121 A1 Sep. 11, 2003

(30) Foreign Application Priority Data

Oct. 20, 2001 (KR) .................. 10-2001-0064967

(51) Int. Cl.
*H03M 13/00* (2006.01)
*H03M 13/03* (2006.01)
*G06F 11/00* (2006.01)
*G08C 25/02* (2006.01)

(52) U.S. Cl. .............. 714/755; 714/790; 714/800; 714/786; 714/748

(58) Field of Classification Search ............ 714/755, 714/790, 786, 746, 758, 748; 370/342, 320, 370/335; 455/451, 452.1
See application file for complete search history.

(56) References Cited

U.S. PATENT DOCUMENTS

| | | | |
|---|---|---|---|
| 5,689,439 A * | 11/1997 | Weerackody et al. ...... | 370/329 |
| 5,909,434 A * | 6/1999 | Odenwalder et al. ...... | 370/342 |
| 6,202,189 B1 | 3/2001 | Hinedi et al. | |
| 6,247,150 B1 * | 6/2001 | Niemela ................... | 714/701 |
| 6,397,367 B1 * | 5/2002 | Park et al. ................ | 714/786 |
| 6,697,986 B1 * | 2/2004 | Kim et al. ................. | 714/751 |
| 6,751,772 B1 * | 6/2004 | Kim et al. ................. | 714/786 |
| 2002/0006138 A1 * | 1/2002 | Odenwalder ............. | 370/468 |
| 2003/0088822 A1 * | 5/2003 | Kim et al. ................. | 714/790 |
| 2003/0135811 A1 * | 7/2003 | Xu et al. ................... | 714/790 |
| 2005/0123427 A1 * | 6/2005 | Kim et al. ................. | 417/572 |

FOREIGN PATENT DOCUMENTS

| | | |
|---|---|---|
| EP | 1 170 896 | 1/2002 |
| EP | 1 176 725 | 1/2002 |
| EP | 1 227 596 | 7/2002 |

(Continued)

OTHER PUBLICATIONS

Combined Search and Examination Report dated Feb. 28, 2003, issued in a counterpart application, namely, Appln. No. GB 0224314.5.

(Continued)

*Primary Examiner*—Phung My Chung
(74) *Attorney, Agent, or Firm*—Dilworth & Barrese LLP

(57) ABSTRACT

A transmitter simultaneously performs channel coding and rate matching in a CDMA mobile communication system. The transmitter encoders input bits into coded bits at a given mother code rate, and performs puncturing on the coded bits in order to match the number of coded bits to a predetermined code rate. Thereafter, the transmitter simultaneously performs rate matching for repeating or puncturing the coded bits in order to match the number of coded bits to the number of bits transmitted over a radio channel.

34 Claims, 8 Drawing Sheets

FOREIGN PATENT DOCUMENTS

| WO | WO 99/65148 | 12/1999 |
| WO | WO 01/03369 | 1/2001 |
| WO | WO 01/63773 | 8/2001 |

OTHER PUBLICATIONS

Preliminary Search Report dated Aug. 6, 2003 issued in a counterpart application, namely Appln. No. 0 213109000.

* cited by examiner

APPARATUS AND METHOD FOR PERFORMING CODING AND RATE MATCHING IN A CDMA MOBILE COMMUNICATION SYSTEM

PRIORITY

This application claims priority to an application entitled "Apparatus and Method for Performing Coding and Rate Matching in a CDMA Mobile Communication System" filed in the Korean Industrial Property Office on Oct. 20, 2001 and assigned Serial No. 2001-64967, the contents of which are incorporated herein by reference.

BACKGROUND OF THE INVENTION

1. Field of the Invention

The present invention relates generally to a data transmission/reception apparatus and method in a CDMA (Code Division Multiple Access) mobile communication system, and in particular, to a data transmission/reception apparatus and method using united channel coding and rate matching.

2. Description of the Related Art

In a mobile communication system, it is actually impossible to receive a signal transmitted from a transmitter through a wireless network without distortions and noises. Therefore, various techniques for minimizing the distortion and noise have been proposed, and an error control coding technique is a typical proposed techniques. In the latest CDMA mobile communication system, turbo codes and convolutional codes are used for the error control coding technique. An apparatus for the error control coding technique is generally called a "channel encoder."

FIG. 1 illustrates a structure of a common transmitter in a CDMA mobile communication system. Referring to FIG. 1, N data transport (N Tx) blocks transmitted from an upper layer are provided as an input of a tail bit inserter 110. The tail bit inserter 110 inserts tail bits in each of the N data transport blocks. The tail bit inserter 110, when it utilizes convolutional codes, is arranged preceding a channel encoder 120. However, the tail bit inserter 110, when it utilizes turbo codes, may be included in the channel encoder 120. That is, for the tail bit insertion, a memory in the channel encoder 120 is initialized at a time point where coding in an input data unit is ended. The channel encoder 120 includes at least one code rate in order to encode the N transport blocks. A typical code rate (k/n) is ½ or ¾. In the code rate, k (k=1,3, . . . ) indicates the number of bits of the input data unit applied to the channel encoder 120, and n (n=2,4, . . . ) indicates the number of bits output from the channel encoder 120. Therefore, at a code rate ½, the channel encoder 120 receives, for example, 100 bits and outputs 200 bits, and a code rate ¾, the channel encoder 120 receives, for example, 300 bits and outputs 400 bits. That is, the code rate represents a ratio of the number of bits of the input data unit to the number of coded output bits. In addition, the channel encoder 120 supports a plurality of code rates through puncturing or repetition commonly based on a mother code rate of ⅓ or ⅕. In the case of the mother code rate ⅓, in order to support the code rate ½, the channel encoder 120 generates 300 bits for 100 input bits at the mother code rate ⅓ and then punctures 100 bits from the 300 bits. The channel encoder 120, if it uses the turbo codes, generates systematic bits as an output and parity bits having an error correction capability for the systematic bits. In FIG. 1, the channel encoder 120 determines a code rate to use under the control of a controller 160. Recently, 3GPP (3$^{rd}$ Generation Partnership Project) and 3GPP-2 that have defined the 3$^{rd}$ generation mobile communication standard, have examined the HSDPA (High Speed Data Packet Access) and 1×EV-DV standards for servicing high-speed radio packet data through a shared channel. An adaptive coding and modulation technique is one of the core techniques determined for the standards. This technique adaptively changes the code rate and a modulation order according to a condition of the radio link. In the technique, the controller determines a proper code rate according to a channel condition such that the channel encoder can perform coding at a desired code rate. Such a link adaptation technique can be divided into a power control technique and an AMCS (Adaptive Modulation and Coding Scheme) technique. The power control technique is commonly used in the existing mobile communication system, but the AMCS is used only in an HSDPA mobile communication system.

In the UMTS (Universal Mobile Telecommunications System) standard (Release '99) adopted by the 3GPP, coded bits output from the channel encoder 120 are applied to a rate matcher 130. The rate matcher 130 performs rate matching on the coded bits. Commonly, the number of coded bits output from the channel encoder 120 is not identical to the total number of bits of a transport unit (TU) on the air. The rate matching is an operation of matching the number of coded bits to the total number of bits required on the air through repetition and puncturing on the coded bits. The rate matching is disclosed in detail in the standard adopted by the 3GPP, so an addition description will not be provided. It is expected that the rate matching will be used even in the HSDPA standard.

The coded bits, the number of which is controlled by the rate matcher 130, are applied to an interleaver 140. The interleaver 140 performs interleaving on the coded bits. The interleaving is performed to separate neighboring coded bits as far from one another as possible, thereby maximizing an error correction capability even though a loss occurs in specific data during data transmission over a radio channel. For example, as stated above, since the channel encoder 120 generates systematic bits and parity bits, the neighboring coded bits include systematic bits and associated parity bits. Therefore, when the systematic bits and the parity bits are simultaneously lost, an error correction capability of a channel decoder in a receiver is drastically reduced. For example, in a common radio environment which is affected by fading, a burst error indicating that data bits in a specific position are simultaneously lost occurs frequently. The interleaver 140 performs a function of separating neighboring coded bits as far from one another as possible in order to minimize a data loss due to the burst error.

The interleaved coded bits are applied to a modulator 150. In the HSDPA standard, the interleaved coded bits are modulated by a predetermined one of various modulation techniques such as QPSK (Quadrature Phase Shift Keying), 8PSK (8-ary Phase Shift Keying), 16QAM (16-ary Quadrature Amplitude Modulation) and 64QAM (64-ary Quadrature Amplitude Modulation) before being transmitted. Of the modulation techniques, a high-order modulation technique can transmit more information compared with a low-order modulation technique. However, if it is assumed that the transmitter transmits data at the same power level of the different modulation techniques, a probability of data loss is relatively high when the high-order modulation technique is used as compared to when the low-order modulation technique is used. Therefore, it is necessary to select an optimal modulation technique according to the channel environment. This is controlled by the AMCS controller 160.

FIG. 2 illustrates a detailed structure of the channel encoder 120 shown in FIG. 1. As illustrated in FIG. 2, the channel encoder 120 includes two constituent encoder 212 and 214 with a mother code rate 1/M, an interleaver 210 and a puncturer 216.

Referring to FIG. 2, the first constituent encoder 212 receives a predetermined number of input data bits $X_k$ and outputs coded bits to its output port $Y_{k,1}$, if a predetermined mother code rate is ⅓. The interleaver 210 interleaves the input data bits $X_k$. The second constituent encoder 214 encodes the interleaved data bits $X'_k$ received from the interleaver 210. If the mother code rate is ⅓, the second constituent encoder 214 outputs the coded bits to its output port $Y_{k,(M+1)/2}$. The systematic bits $X_k$ mean actual transmission data, and the parity bits $Y_k$ are added to correct an error generated during decoding at the receiver. In FIG. 2, outputs of the first encoder 212 are represented, $Y_{k,1}, \ldots, Y_{k,(M-1)/2}$, and outputs of the second encoder 214 are represented by, $Y_{k,(M+1)/2}, \ldots, Y_{k,M-1}$. That is, as the mother code rate is increased to ⅓, ⅕ and ⅐, output ports of the first and second constituent encoders 212 and 214 increase in number. The puncturer 216 is controlled according to a code rate determined by the controller 160. Specifically, the puncturer 216 selectively punctures the systematic bits or the parity bits according to a predetermined puncturing pattern, and outputs punctured coded bits $C_n$, thereby satisfying a predetermined code rate and modulation rate. That is, the puncturer 216 is provided with a predetermined puncturing pattern from the controller 160 according to the code rate, and punctures the coded bits output from the first and second encoders 212 and 214.

FIG. 3 illustrates a detailed structure of the first and second encoders 212 and 214 shown in FIG. 2. As illustrated in FIG. 3, the first and second encodes 212 and 214 each generally include a plurality of shift registers.

Referring to FIG. 3, the encoder encodes an input bit $X_k$ into a systematic bit $X_k$ and a parity bit $Y_k$. The encoder can generate a different parity bit for the same input bit according to how the shift registers D and adders 302–305 are connected. Initial values of the shift registers D are all 0's, and outputs of the encoder with a mother code rate 1/M (M=3,5,7, . . . ) are $X_1, Y_{1,1}, Y_{1,2}, \ldots, Y_{1,M-1}, X_2, Y_{2,1}, Y_{2,2}, \ldots, Y_{2,M-}, \ldots, Y_{k,1}, Y_{k,2}, \ldots, Y_{k,M-1}$, where k represents the total number of input bits. After encoding all input bits, a switch 301 in FIG. 3 is switched such that the coded bits are fed back to the shift registers D. The feedback coded bits are used as tail bits. Therefore, the encoder illustrated in FIG. 3 can generate 3 tail bits. As the channel encoder 120 is comprised of two encoders 212 and 214, the channel encoder 120 generates a total of 6 tail bits. The number of tail bits generated by the encoder is identical to the number of shift registers D comprising the encoder. If the 3 tail bits are applied to the first constituent encoder 212, the first constituent encoder 212 encodes the received tail bits, and then initializes the shift registers to their initial values 0's. The 3 tail bits generated by the second constituent encoder 214 are applied to the second constituent encoder 214, and the second constituent encoder 214 encodes the received tail bits, and then initializes the shift registers D. Meanwhile, the tail bits generated by the constituent encoders and the coded bits generated by encoding the tail bits are called TT (Trellis Termination) bits. If the two encoders with a mother code rate 1/M each include L shift registers, (M+1)×L TT bits are generated. The TT bits undergo puncturing or repetition by the rate matcher 130 along with the coded bits.

FIG. 4 illustrates a detailed structure of the rate matcher 130 shown in FIG. 1. As illustrated in FIG. 4, the rate matcher 130 is divided into a bit separator (or demultiplexer) 410, a bit collector (or multiplexer) 450, and rate matching processors 420, 430 and 440. FIG. 5 illustrates a general procedure for performing rate matching.

Referring to FIGS. 4 and 5, an input signal $C_n$ from the channel encoder 120 is provided to the rate matcher 130. For the input signal $C_n$, the rate matcher 130 determines whether the number ΔN of bits to be punctured and repeated is a positive number or a negative number, and determines to perform repetition or puncturing according to the determined results (Step 512 of FIG. 5). That is, if the ΔN is a negative number, the rate matcher 130 punctures as many bits as the ΔN among the $C_n$. Otherwise, if the ΔN is a positive number, the rate matcher 130 repeats as many bits as the ΔN among the $C_n$.

For example, if the ΔN is a negative number, the $C_n$ is provided to the bit separator 410. The bit separator 410 separates the input bits $C_n$ into M bits $S_0$ to $S_{M-1}$. The $S_0$ represents all systematic bits $X_k$ among the input bits $C_n$. Here, the $S_0$ may include a few of TT bits. The $S_1$ to $S_{M-1}$ represent $Y_{k,1}$ to $Y_{k,M-1}$, respectively. Each of the $S_1$ to $S_{M-1}$ may also include a few of TT bits. The $S_1$ to $S_{M-1}$ are provided to their associated rate matching processors 430 and 440, which determine the bits to be punctured according to a puncturing amount $\Delta N_i$ (i=1~N-1). A process of determining by the rate matching processors 430 and 440 whether to puncture each of the $S_1$ to $S_{M-1}$ is performed in steps 514 to 522 of FIG. 5. In most cases, the puncturing is performed on the parity bits rather than the systematic bits. Therefore, as illustrated in FIG. 4, the systematic bits $S_0$ are provided directly to the bit collector 450 without separate rate matching. The bit collector 450 punctures the bits determined to be punctured among the coded bits provided from the rate matching processors 430 and 440, and outputs the non-punctured coded bits along with the systematic bits $S_0$ provided from the bit separator 410.

However, if the ΔN is a positive number, bit repetition must be performed. Therefore, the input bits $C_n$ are applied to the rate matching processor 420 where they undergo bit repetition. The rate matching processor 420 for bit repetition is applied to both the systematic bits and the parity bits, and this process is performed in steps 524 to 534 of FIG. 5.

The coded bits $g_r$ output from the rate matching processor 420 and the bit collector 450 are interleaved by the interleaver 140, and finally modulated by the modulator 150 before being transmitted to a receiver.

FIG. 5 illustrates a general procedure for performing rate matching. The parameters used in describing the rate matching operation with reference to FIGS. 4 and 5 include:

e: an initial error between a current puncturing rate and a desired puncturing rate;

$e_{ini}$: an initial value of the e;

$e_{minus}$: a decrement of the e;

$e_{plus}$: an increment of the e;

m: an index of a current bit;

δ: a value except 0 and 1 (a bit except 0 and 1 is punctured by the bit collector 450); and D: the total number of bits applied to a rate matching algorithm The parameters $e_{ini}$, $e_{minus}$, and $e_{plus}$ are determined from the number ΔN of bits to be punctured or repeated, and the determining method is based on a rate matching technique defined by the 3GPP standard. The initial puncturing position are determined by the parameter $e_{ini}$.

Referring to FIG. 5, in step 510, the rate matcher 130 sets a parameter e to an initial value $e_{ini}$ and sets a count value m to 1. In step 512, the rate matcher 130 compares the number ΔN of bits to be punctured or repeated with "0" to determine whether the ΔN is a positive number of a negative number. If it is determined in step 512 that the ΔN is a negative number, the rate matcher 130 performs a puncturing process through steps 514 to 522. Otherwise, if it is determined in step 512 that the ΔN is a positive number, the rate matcher 130 performs a repetition process through steps 524 to 530.

First, the puncturing process will be described in detail. In step 514, the rate matcher 130 compares a parameter m indicating the order of a bit to be currently processed with the total number D of input bits (m≦D), to determine whether the rate matching has been completely performed on all input bits. If it is determined in step 514 that the rate matching has been completely performed on all input bits, the rate matcher 130 ends the puncturing process. However, if it is determined in step 514 that the rate matching has not been completely performed on all input bits, the rate matcher 130 proceeds to step 516. In step 516, the rate matcher 130 updates the value e by calculating a difference $e-e_{minus}$ between the e and a decrement value $e_{minus}$ provided from an upper layer. After updating the e, the rate matcher 130 determines in step 518 whether the updated value e is less than or equal to "0." If it is determined in step 518 that the updated value e is less than or equal to "0," the rate matcher 130 proceeds to step 520 since the corresponding input bit is a puncturing bit. In step 520, the rate matcher 130 sets δ to a value except 0 and 1. Setting the δ to a value except 0 and 1 is equivalent to designating a bit to be punctured by the bit collector 450. Further, in step 520, the rate matcher 130 updates the e by calculating a sum $e+e_{plus}$ of the e and an increment value $e_{plus}$ provided from the upper layer. If the e is greater than "0" in step 518 or the operation of step 520 is completed, the rate matcher 130 increases, in step 522, the m by 1 to select the next bit, and then returns to step 514 to repeat the puncturing process.

Next, the repetition process will be described in detail. In step 524, the rate matcher 130 compares the m with the D (m≦D) to determine whether the rate matching has been completed. If it is determined in step 524 that the rate matching has been completed, the rate matcher 130 ends the repetition process. However, if it is determined in step 524 that the rate matching has not been completed yet, the rate matcher 130 proceeds to step 526. In step 526, the rate matcher 130 updates the e by calculating a difference $e-e_{minus}$ between the e and the $e_{minus}$. After updating the e, the rate matcher 130 determines in step 528 whether the updated value e is less than or equal to "0." If it is determined in step 528 that the updated value e is less than or equal to "0," the rate matcher 130 proceeds to step 530 since the corresponding input bit is a repetition bit. In step 530, the rate matcher 130 repeats the corresponding input bit $S_{i,m}$. Further, in step 530, the rate matcher 130 updates the e by calculating a sum $e+e_{plus}$ of the e and the $e_{plus}$, and then returns to step 528 and compares again the updated value e with "0" thereby to determine whether the repetition must be performed again. That is, the rate matcher 130 repeats the corresponding input bit a predetermined number of times, through the steps 528 and 530. However, if the e is greater than "0" in step 528, the rate matcher 130 increases, in step 532, the m by 1 to select the next bit, and then returns to step 524 to repeat the repetition process.

As described above, in a transmitter for the conventional CDMA mobile communication system, the channel encoder and the rate matcher are separately constructed. In this case, one puncturing is performed by a puncturer in the channel encoder and another puncturing is performed again by the rate matcher, thus causing an increase in hardware complexity and a processing time and a decrease in performance of the channel encoder.

SUMMARY OF THE INVENTION

It is, therefore, an object of the present invention to provide a data transmission/reception apparatus and method for improving the entire system performance by uniting puncturing/repetition for channel coding with puncturing/repetition for rate matching.

It is another object of the present invention to provide a data transmission/reception apparatus and method for simultaneously performing puncturing/repetition for channel coding and puncturing/repetition for rate matching by performing a single puncturing/repetition operation on coded bits.

It is further another object of the present invention to provide an apparatus and method for uniting puncturing/repetition for channel coding with puncturing/repetition for rate matching, to increase performance of a channel encoder and to simplify the HARQ (Hybrid Automatic Retransmission Request) procedure.

According to a first aspect of the present invention, there is provided a transmitter for use in a mobile communication system including an encoder for encoding a stream of information bits received for a given transmission period at a mother code rate and generating the stream of systematic bits and a plurality of streams of parity bits, and a processor for providing plurality of parameters for rate matching to zero (0) a difference determined by subtracting the total number of the systematic bits and the parity bits generated by the encoder from the total number of bits transmitted over a radio channel for the given transmission period. The transmitter comprises a rate matcher, if the difference is a negative value, for uniformly puncturing equal number of bits corresponding to the difference in the streams of the parity bits without puncturing the stream of the systematic bits, and, if the difference is a positive value, for repeating equal number of bits corresponding to the difference in the stream of the systematic bits and the streams of the parity bits to mach the number of bits to be transmitted.

According to a second aspect of the present invention, there is provided a transmission method in a mobile communication system including an encoder for encoding a stream of information bits received for a given transmission period at a mother code rate and generating the stream of systematic bits and a plurality of streams of parity bits, and a processor for providing plurality of parameters for rate matching to zero (0) a difference determined by subtracting the total number of the systematic bits and the parity bits generated by the encoder from the total number of bits transmitted over a radio channel for the given transmission period. Upon receiving a puncturing request based on the difference, the transmitter uniformly punctures the streams of the parity bits by the equal number of bits in each streams of parity bits without puncturing the stream of the systematic bits, thereby puncturing as many bits as the difference. Upon receiving a repetition request, the processor changes parameters to transmit different bits for a previous transmission bits. The transmitter repeats certain number of bits in the stream of the systematic bits and the streams of the parity bits by the almost equal number of bits, thereby repeating as many bits as the difference.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
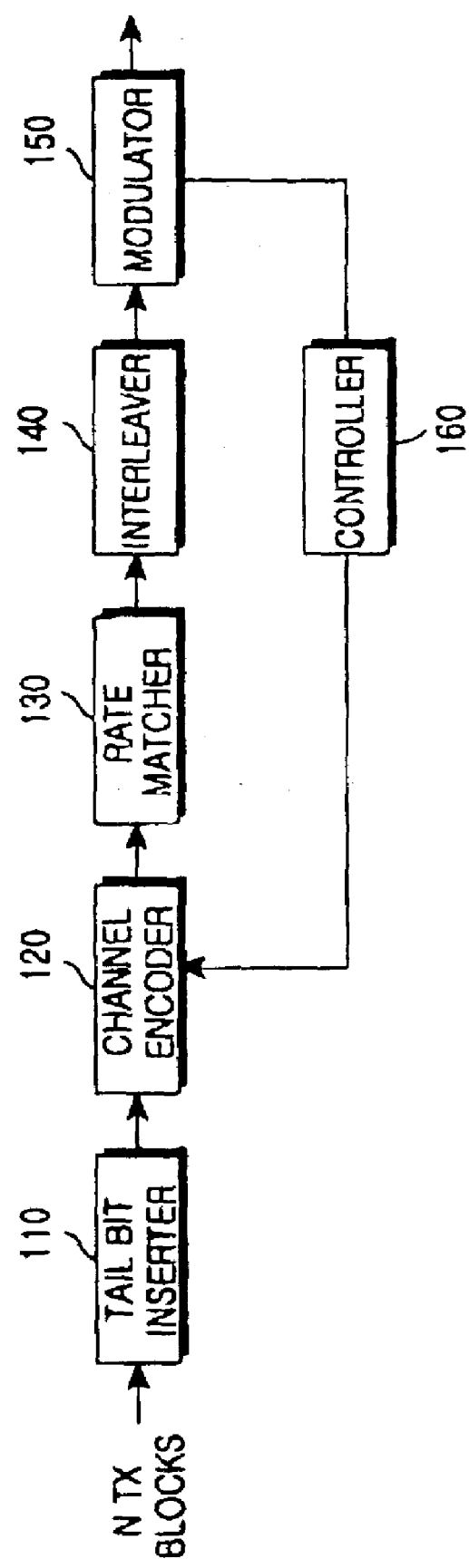
FIG. 1 illustrates a structure of a common transmitter in a CDMA mobile communication system.
Figure 2:
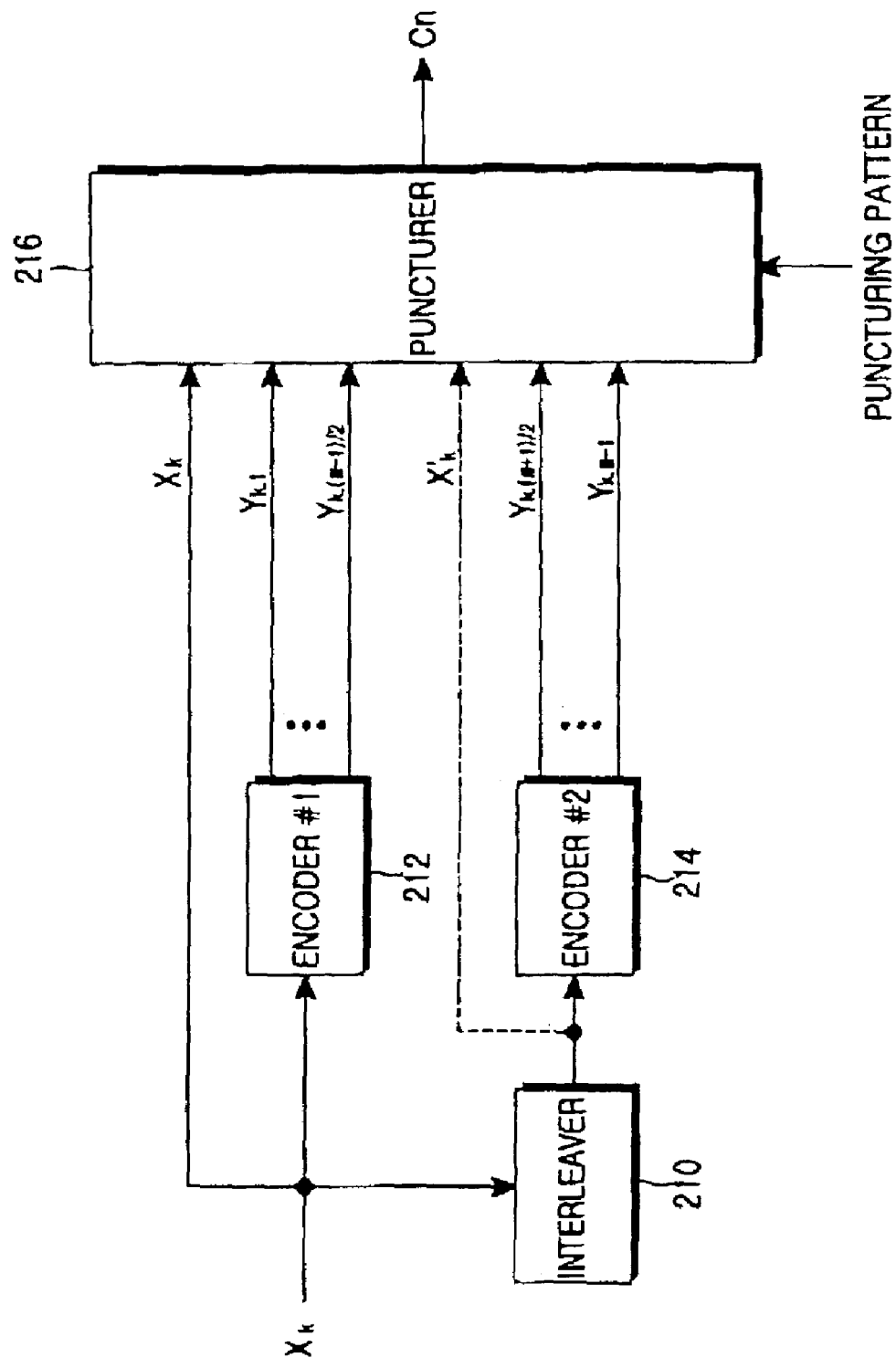
FIG. 2 illustrates a detailed structure of the channel encoder shown in FIG. 1.
Figure 3:
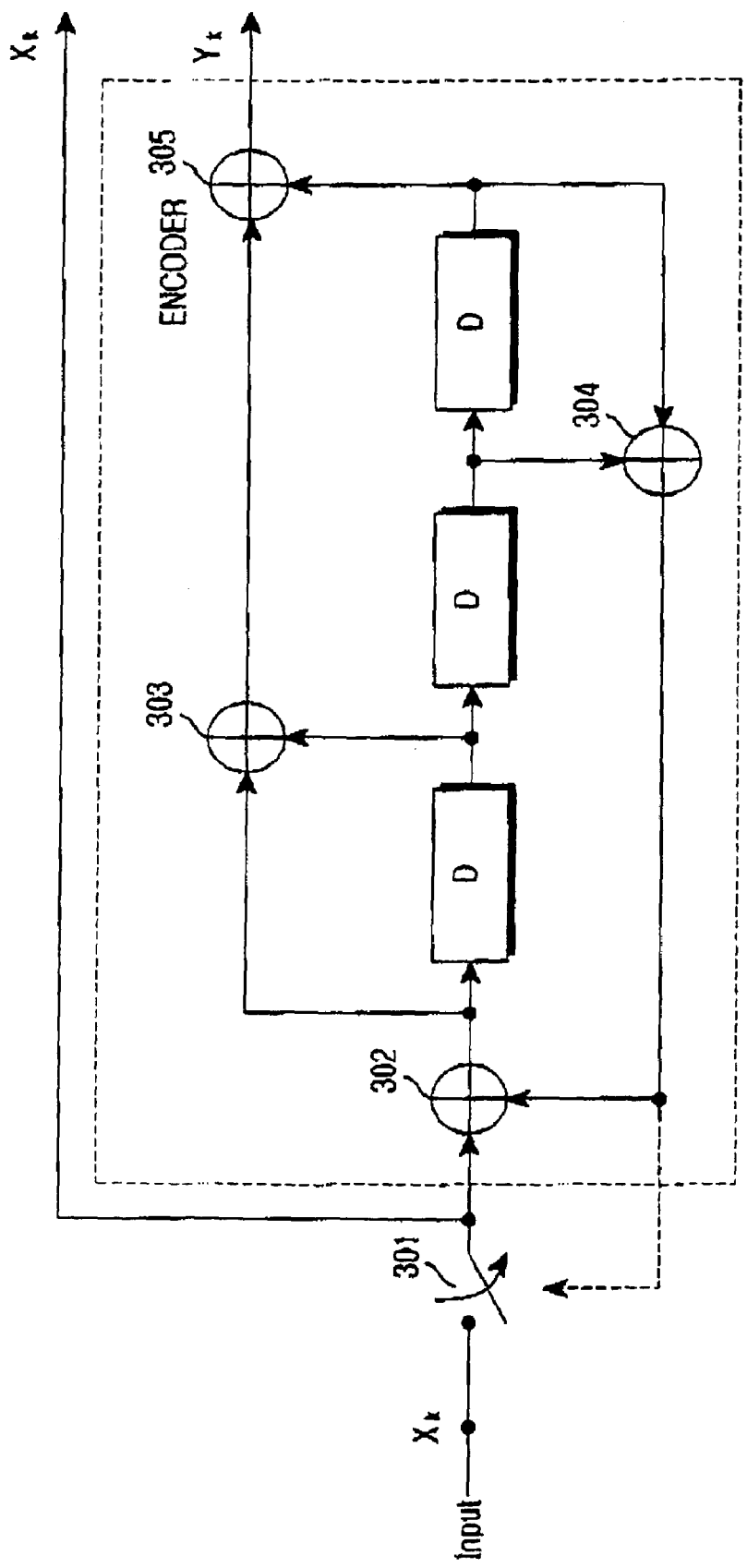
FIG. 3 illustrates a detailed structure of the encoders shown in FIG. 2.
Figure 4:
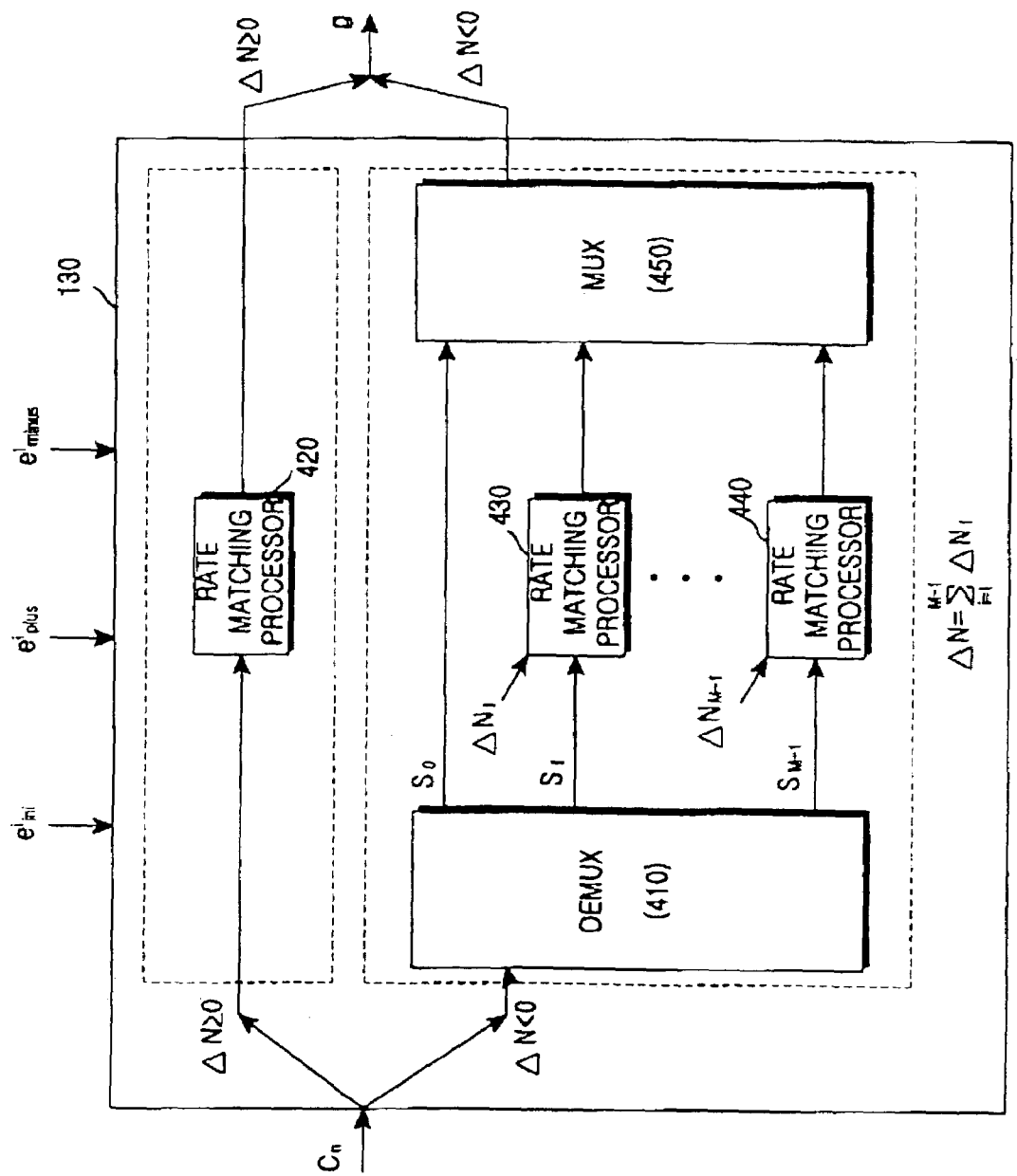
FIG. 4 illustrates a detailed structure of the rate matcher shown in FIG. 1.

A preferred embodiment of the present invention will be described herein below with reference to the accompanying drawings. In the following description, well-known functions or constructions are not described in detail since they would obscure the invention in unnecessary detail.

In a transmitter for a common CDMA mobile communication system, a purpose of a puncturer in a channel encoder is different from that of a rate matcher. However, as the puncturer in the channel encoder also performs repetition as well as puncturing, the puncturer is similar in operation to the rate matcher. Therefore, in an embodiment of the present invention it is necessary to manage the puncturer in the channel encoder and the rate matcher together rather than independently. In addition, it is necessary to increase performance of the channel encoder by preventing repetition from being performed by the rate matcher after puncturing is performed by the channel encoder.

A channel encoder applied to the packet communication standard (e.g., HSDPA or 1×EV-DV) in the latest CDMA mobile communication system has introduced an AMCS-based link adaptation technique. Therefore, the channel encoder generates parity bits, the number of which is generally greater (or less) than the number of bits that can be transmitted. This means that a mother code rate is not identical to a code rate that is actually applied. Therefore, the puncturer performs puncturing or repetition. In addition, when the HARQ (Hybrid Automatic Retransmission Request), a typical high-speed packet data transmission technique, is used, a puncturing pattern may be changed during retransmission. The HARQ is a link control technique used when an error occurs in initially transmitted packet data. Therefore, the HARQ is a technique for retransmitting packet data that was defective in its initial transmission, in order to compensate for the defective packet data. The HARQ can be divided into Chase Combining (CC), Full Incremental Redundancy (FIR), and Partial Incremental Redundancy (PIR). The CC is a technique for transmitting during retransmission the same packet as transmitted at initial transmission, so a puncturing pattern used at retransmission is identical to a puncturing pattern used at initial transmission. The FIR is a technique for transmitting systematic bits and parity bits in a specific ratio at initial transmission, and transmitting a packet comprised of only some or all of the parity bits at retransmission to improve a coding gain of a decoder in a receiver. The PIR is a technique for transmitting during retransmission a data packet comprised of systematic bits and previously non-transmitted new parity bits. The PIR has a similar effect to the CC by combining during decoding the systematic bits with initially transmitted systematic bits, and has a similar effect to the FIR by decoding the parity bits. Unlike the CC, Incremental Redundancy (IR) comprised of the FIR and the PIR should change a puncturing pattern during retransmission. Therefore, the HARQ should also be taken into consideration in order to manage together the puncturer in the channel encoder and the rate matcher. Accordingly, an embodiment of the present invention will provide a method for combined management of the puncturer in the channel encoder and the rate matcher taking the HARQ into consideration. Although the present invention will be described with reference to an example where a turbo encoder is used as the channel encoder, the invention can also be applied to a case where a convolutional encoder is used as the channel encoder. In this case, the systematic bits and the parity bits all serve as parity bits.

Before a description of an embodiment of the present invention, a description will be made of exemplary puncturing patterns based on the code rates used in the AMCS, and channel coding and rate matching processes performed by the puncturing patterns. Herein, a mother code rate of ⅓ will be assumed, and code rates used in the AMCS will include ¼ and ½ among ¼, ½ and ¾. The code rates ½ and ¾ need puncturing, since they are greater than the mother code rate ⅓. However, the code rate ¼ needs repetition, since it is less than the mother code rate ⅓. In the puncturing patterns given below, "0" means puncturing of a corresponding coded bit, "1" means non-puncturing of the corresponding coded bit, and a value greater than "1" means repetition of the corresponding coded bit. For example, "2" in the puncturing pattern means two repetitions of the corresponding coded bit.

First of all, exemplary puncturing patterns based on the code rates used in the AMCS will be described.

First, Table 1 illustrates exemplary puncturing patterns according to initial transmission and retransmissions, for a mother code rate of ⅓ and a code rate of ½.

TABLE 1

| Initial Transmission and Retransmissions | Puncturing Patterns |
|---|---|
| Initial Transmission | $\begin{bmatrix} X_k & X_{k+1} & X_{k+2} \\ Y_{k,1} & Y_{k+1,1} & Y_{k+2,1} \\ Y_{k,2} & Y_{k+1,2} & Y_{k+2,2} \end{bmatrix} = \begin{bmatrix} 1 & 1 & 1 \\ 1 & 0 & 1 \\ 0 & 1 & 0 \end{bmatrix}$ |
| CC | $\begin{bmatrix} X_k & X_{k+1} & X_{k+2} \\ Y_{k,1} & Y_{k+1,1} & Y_{k+2,1} \\ Y_{k,2} & Y_{k+1,2} & Y_{k+2,2} \end{bmatrix} = \begin{bmatrix} 1 & 1 & 1 \\ 1 & 0 & 1 \\ 0 & 1 & 0 \end{bmatrix}$ |
| PIR | $\begin{bmatrix} X_k & X_{k+1} & X_{k+2} \\ Y_{k,1} & Y_{k+1,1} & Y_{k+2,1} \\ Y_{k,2} & Y_{k+1,2} & Y_{k+2,2} \end{bmatrix} = \begin{bmatrix} 1 & 1 & 1 \\ 0 & 1 & 0 \\ 1 & 0 & 1 \end{bmatrix}$ |

TABLE 1-continued

| Initial Transmission and Retransmissions | Puncturing Patterns |
|---|---|
| FIR | $\begin{bmatrix} X_k & X_{k+1} & X_{k+2} \\ Y_{k,1} & Y_{k+1,1} & Y_{k+2,1} \\ Y_{k,2} & Y_{k+1,2} & Y_{k+2,2} \end{bmatrix} = \begin{bmatrix} 0 & 0 & 0 \\ 1 & 1 & 1 \\ 1 & 1 & 1 \end{bmatrix}$ |

A channel encoder with a mother code rate of ⅓ encodes 3 input bits into 9 coded bits according to the puncturing pattern illustrated in Table 1, and then punctures 3 bits from the 9 coded bits, thereby outputting 6 coded bits. During retransmission, the CC uses the same puncturing pattern as that used at initial transmission, but the PIR and FIR use different puncturing pattern from the puncturing pattern used at initial transmission.

Second, Table 2 illustrates exemplary puncturing patterns according to initial transmission and retransmissions, for a mother code rate of ⅓ and a code rate of ¼.

TABLE 2

| Initial Transmission and Retransmissions | Puncturing Patterns |
|---|---|
| Initial Transmission | $\begin{bmatrix} X_k & X_{k+1} & X_{k+2} \\ Y_{k,1} & Y_{k+1,1} & Y_{k+2,1} \\ Y_{k,2} & Y_{k+1,2} & Y_{k+2,2} \end{bmatrix} = \begin{bmatrix} 1 & 2 & 1 \\ 1 & 1 & 2 \\ 2 & 1 & 1 \end{bmatrix}$ |
| CC | $\begin{bmatrix} X_k & X_{k+1} & X_{k+2} \\ Y_{k,1} & Y_{k+1,1} & Y_{k+2,1} \\ Y_{k,2} & Y_{k+1,2} & Y_{k+2,2} \end{bmatrix} = \begin{bmatrix} 1 & 2 & 1 \\ 1 & 1 & 2 \\ 2 & 1 & 1 \end{bmatrix}$ |
| PIR | $\begin{bmatrix} X_k & X_{k+1} & X_{k+2} \\ Y_{k,1} & Y_{k+1,1} & Y_{k+2,1} \\ Y_{k,2} & Y_{k+1,2} & Y_{k+2,2} \end{bmatrix} = \begin{bmatrix} 1 & 2 & 1 \\ 2 & 1 & 1 \\ 1 & 1 & 2 \end{bmatrix}$ |
| FIR | $\begin{bmatrix} X_k & X_{k+1} & X_{k+2} \\ Y_{k,1} & Y_{k+1,1} & Y_{k+2,1} \\ Y_{k,2} & Y_{k+1,2} & Y_{k+2,2} \end{bmatrix} = \begin{bmatrix} 0 & 0 & 0 \\ 2 & 2 & 2 \\ 2 & 2 & 2 \end{bmatrix}$ |

A channel encoder with a mother code rate of ⅓ encodes 3 input bits into 9 coded bits according to the puncturing pattern illustrated in Table 2, and then repeats 3 bits among the 9 coded bits, thereby outputting 12 coded bits.

Next, channel coding and rate matching processes performed by the puncturing patterns will be described. The rate matching is required when the number of coded bits generated by channel coding is not identical to the total number of bits that can be transmitted. That is, in order to match the number of the coded bits to the total number of the transmittable bits, rate matching for puncturing or repeating the coded bits is performed.

First, Table 3 illustrates examples of outputting the total number of coded bits that can be transmitted through channel coding and rate matching, for a mother code rate of ⅓ and a code rate of ½.

TABLE 3

| | Input Bits | Puncturing Patterns | Coded Bits | Outputs |
|---|---|---|---|---|
| Example #1 (Rate Matching) | 1 –1 1 | $\begin{bmatrix} 1 & 1 & 1 \\ 1 & 0 & 1 \\ 0 & 1 & 0 \end{bmatrix}$ | 1 P –1 P 1 P | 1 –1 P 1 P |
| Example #2 | 1 –1 1 | $\begin{bmatrix} 1 & 1 & 1 \\ 0 & 0 & 1 \\ 0 & 1 & 0 \end{bmatrix}$ | — | 1 –1 P 1 P |

Of the coded bits or outputs in Table 3, 1 or –1 represent systematic bits and P represents parity bits.

In Example #1 of Table 3, if the total number of transmittable bits is 5, the channel encoder with a mother code rate of ⅓ encodes 3 input bits into 9 coded bits, generates 6 coded bits by puncturing 3 bits from the 9 coded bits according to the puncturing pattern, and then punctures one of the 6 coded bits, for rate matching. Example #1 of Table 3 shows the conventional method where the channel coding and the rate matching are separated. However, Example #2 of Table 3 shows a novel method where channel coding and rate matching are united according to the present invention. As illustrated in Example #1 of Table 3, a second coded bit is punctured from 6 coded bits by rate matching, so that 5 coded bits are output as the total number of transmittable coded bits. In Example #2 of Table 3 corresponding to Example #1, it is possible to output 5 transmittable coded bits through one puncturing process by inserting "0" (puncturing) into the puncturing pattern at a position of a coded bit punctured by rate matching of Example #1. An output result by Example #1 is identical to an output result by Example #2.

Second, Table 4 illustrates examples of outputting the total number of coded bits transmittable through channel coding and rate matching, for a mother code rate of ⅓ and a code rate of ¼.

TABLE 4

| | Input Bits | Puncturing Patterns | Coded Bits | Outputs |
|---|---|---|---|---|
| Example #3 (Rate Matching) | 1 –1 1 | $\begin{bmatrix} 1 & 2 & 1 \\ 1 & 1 & 2 \\ 2 & 1 & 1 \end{bmatrix}$ | 1 P P P –1 –1 P P 1 P P P | 1 P P –1 –1 P 1 P P |

TABLE 4-continued

| | Input Bits | Puncturing Patterns | Coded Bits | Outputs |
|---|---|---|---|---|
| Example #4 | 1 –1 1 | $\begin{bmatrix} 1 & 2 & 1 \\ 1 & 0 & 1 \\ 1 & 1 & 1 \end{bmatrix}$ | — | 1 P P –1 –1 P 1 P P |

Example #3 of Table 4 shows the conventional method, wherein if the total number of transmittable bits is 9, 3 bits are punctured from 12 coded bits for rate matching. However, Example #4 of Table 4 shows a novel method wherein channel coding and rate matching are united according to an embodiment of the present invention. Specifically, Example #4 shows a puncturing pattern, and coded bits generated by simultaneously performing channel coding and rate matching according to the puncturing pattern. As illustrated in Example #3 of Table 4, fourth, seventh and eleventh coded bits are punctured from the 12 coded bits for rate matching, so that 9 coded bits are output as the total number of transmittable bits. In Example #4 of Table 4 corresponding to Example #3, it is possible to output 9 transmittable coded bits through one puncturing process by inserting "0" (puncturing) into the puncturing pattern at positions of coded bits punctured by rate matching of Example #3. An output result by Example #3 is identical to an output result by Example #4.

It is noted from Table 3 and Table 4 that when predetermined coded bits are punctured for rate matching, parity bits are first punctured instead of the systematic bits.

Third, Table 5 illustrates examples of outputting the total number of coded bits transmittable through channel coding and rate matching, for a mother code rate of ⅓ and a code rate of ½.

TABLE 5

| | Input Bits | Puncturing Patterns | Coded Bits | Outputs |
|---|---|---|---|---|
| Example #5 (Rate Matching) | 1 –1 1 | $\begin{bmatrix} 1 & 1 & 1 \\ 1 & 0 & 1 \\ 0 & 1 & 0 \end{bmatrix}$ | 1 P –1 P 1 P | 1 P –1 –1 P 1 P |
| Example #6 | 1 –1 1 | $\begin{bmatrix} 1 & 2 & 1 \\ 1 & 0 & 1 \\ 0 & 1 & 0 \end{bmatrix}$ | — | 1 P –1 –1 P 1 P |

In Example #5 of Table 5, if the total number of transmittable bits is 7, 1 bit among 6 coded bits is repeated for rate matching. Example #5 of Table 5 shows a puncturing pattern for the case where channel coding and rate matching are separated according to the prior art, coded bits based on the puncturing pattern, and coded bits generated by performing rate matching on the coded bits. Example #6 of Table 5 shows a puncturing pattern for the case where channel coding and rate matching are united according to the present invention, and coded bits generated by performing channel coding and rate matching according to the puncturing pattern. As illustrated in Example #5 of Table 5, one coded bit among the 6 coded bits is repeated for rate matching, so that 7 coded bits are output as the total number of transmittable bits. In Example #5, a third coded bit "–1" among the 6 coded bits is repeated once ("2" in table 5 represents repeat once). In Example #6 of Table 5 corresponding to Example #5, it is possible to output 7 transmittable coded bits through one puncturing process by inserting "1" (repetition) into the puncturing pattern at a position of a coded bit repeated by rate matching of Example #5. An output result by Example #5 is identical to an output result by Example #6.

As can be appreciated from the forgoing examples, independent management of the puncturer in the channel encoder and the rate matcher requires an added and unnecessary process, and it is not possible to perform efficient puncturing with the independent management.

Meanwhile, a resultant puncturing pattern given by Example 6 of Table 5 is represented by $$\begin{bmatrix} 1 & 2 & 1 \\ 1 & 0 & 1 \\ 1 & 1 & 1 \end{bmatrix} \quad \text{Equation (1)}$$

It is noted from Equation (1) that an input bit in a second column in a first row is repeated. In order to obtain a more efficient coding gain compared with the puncturing pattern of Equation (1), it is preferable to transmit a parity bit without repetition of a systematic bit, instead of puncturing a parity bit and then repeat a systematic bit. A puncturing pattern for this is shown by $$\begin{bmatrix} 1 & 1 & 1 \\ 1 & 1 & 1 \\ 1 & 1 & 1 \end{bmatrix} \quad \text{Equation (2)}$$

The foregoing examples have shown that it is possible to realize a united puncturing pattern through examples of puncturing or repeating a predetermined number of bits per puncturing pattern in channel coding and rate matching processes. However, when all coded bits to be transmitted are generated using a puncturing pattern of 9(3*3), the puncturing pattern may be used several times.

Otherwise, a very large puncturing pattern indicating all of the coded bits must be used. A description of the invention will be made for a case where a puncturing pattern of Example #1 shown in Table 3 is used. If the number of input bits is 30, a channel encoder with a mother code rate of ⅓ will generate 90 coded bits. Since the puncturing pattern of Example #1 represents one puncturing unit per 9 bits, if the puncturing pattern is applied 10 times, 3 bits are punctured each time, thus puncturing a total of 30 bits. As a result, 60 coded bits are generated. If rate matching for puncturing 4 bits is needed, it is not possible to perform the rate matching with a method of combined management of puncturing by the channel encoder and puncturing by the rate matcher. Otherwise, a puncturing pattern unit of 90 must be used.

Both of the two cases need complicated processing. For this reason, an operational principle of the present invention is realized by applying each coded bit to a rate matching algorithm instead of a puncturing pattern based on the total number of transmission bits.

Now, a preferred embodiment of the present invention will be described in detail with reference to the accompanying drawings.

Figure 6:
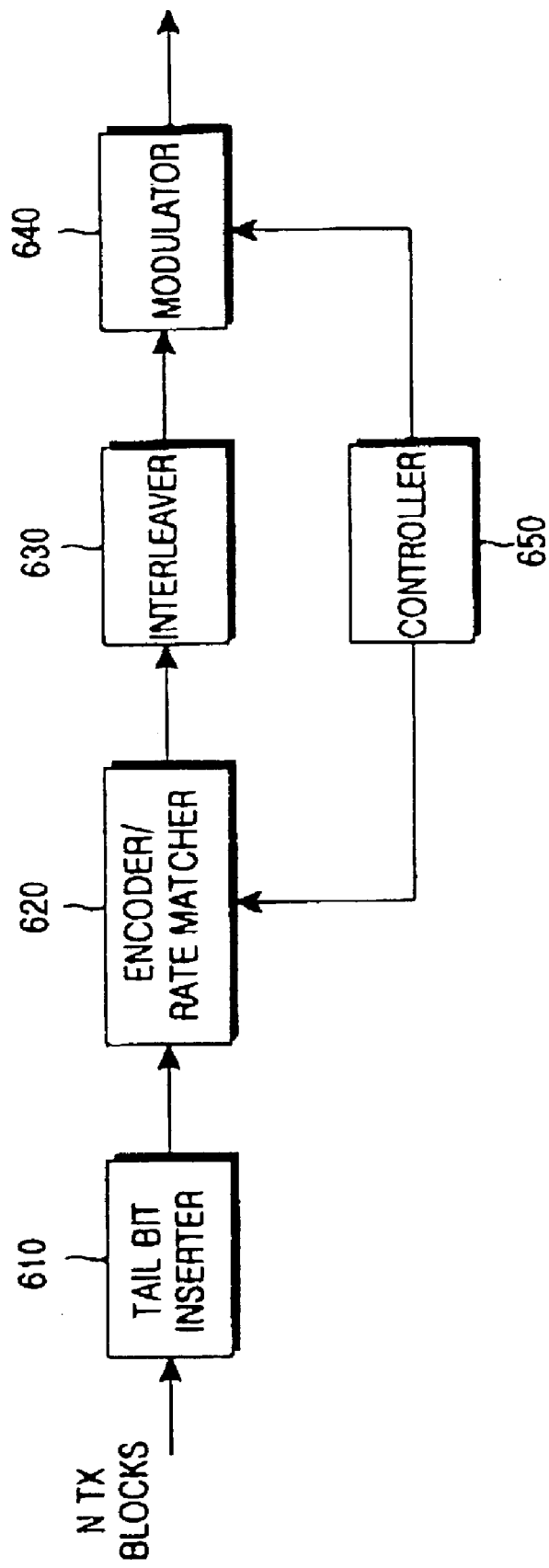
FIG. 6 illustrates a structure of a transmitter in a CDMA mobile communication system according to an embodiment of the present invention.

FIG. 6 illustrates a structure of a transmitter in a CDMA mobile communication system according to an embodiment of the present invention. Referring to FIG. 6, N data transport blocks transmitted from an upper layer to a physical layer is provided to a tail bit inserter 610. The tail bit inserter 610 inserts tail bits in each of the data transport blocks. The N tail bit-inserted transport blocks are first encoded by an encoder/rate matcher 620 at a code rate. Since the coded bits encoded at the code rate are not identical in number to the data bits to be transmitted over a radio channel, some of the coded bits undergo puncturing or repetition for rate matching in order to match the number of coded bits to the number of bits transmitted over the radio channel.

The coded bits generated by the rate matching are interleaved by an interleaver 630, and the interleaved coded bits are modulated by a modulator 640 in a predetermined modulation technique before being transmitted.

As illustrated in FIG. 6, in the embodiment of the present invention, a structure for performing channel coding and a structure for performing rate matching are united into one structure. A processor 650 generates plurality of parameters ($e_{minus}$, $e_{plus}$, $\Delta N$) for rate matching and modulation control signal for the modulator.

Figure 7:
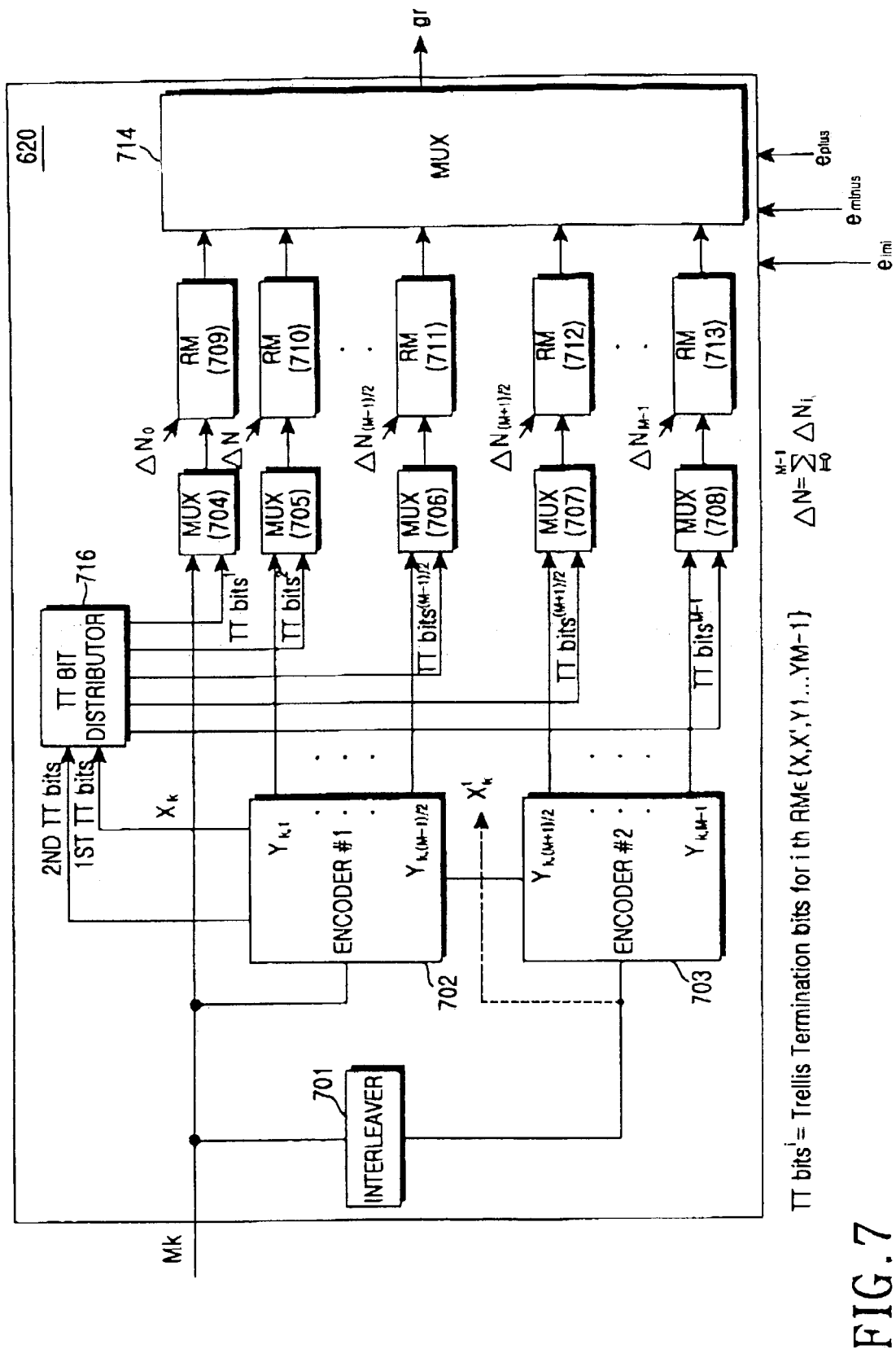
FIG. 7 illustrates a united structure of a channel encoder and a rate matcher according to an embodiment of the present invention.

FIG. 7 illustrates a structure for commonly performing channel coding and rate matching in a transmitter for a CDMA mobile communication system according to an embodiment of the present invention. Specifically, FIG. 7 illustrates a united structure for performing channel coding at a code rate 1/M and performing puncturing or repetition using a rate matching algorithm.

Before a description of the structure of FIG. 7 according to an embodiment of the present invention, the terms used herein will be defined as follows.

The term "input bits" refers to bits received for channel coding, and the term "input bit stream" refers to a stream of the input bits sequentially applied to an encoder. The term "coded bits" means bits output from the encoder, and the term "coded bit stream" means a stream of the coded bits sequentially output from the encoder. The term "systematic bits" means the same bits as the input bits among the coded bits, and the term "systematic bit stream" means a stream of the systematic bits sequentially output from the encoder. The term "parity bits" means parity bits for error-correcting the systematic bits at a receiver, among the coded bits, and the term "parity bit sequence" means a stream of the parity bits sequentially output from the encoder. The term "TT bits" means bits output from the encoder, only for rate matching, and the term "TT bit stream" means a stream of the TT bits sequentially output from the encoder. The term "first TT bits" means TT bits output from a first encoder, the term "second TT bits" means TT bits output from a second encoder. The term "first TT bit stream" means a stream of the first TT bits sequentially output from the first encoder, and the term "second TT bit stream" means a stream of the second TT bits sequentially output from the second encoder. The term "TT bit group" means each group obtained by dividing the TT bits into a plurality of groups associated with a plurality of rate matchers, for rate matching. In some cases, the systematic bits and the parity bits may include tail bits and TT bits. $\Delta N$ means the total number of bits to be punctured or repeated by the plurality of rate matchers. That is, $\Delta N$ indicates a difference between the total number of coded bits encoded at the mother code rate and the total number of bits to be transmitted. $\Delta N_i$ means the number of bits to be punctured or repeated by an $i^{th}$ rate matcher, where "i" is used to indicate one rate matcher among the plurality of rate matchers or distinguish the number of bits to be punctured or repeated by each rate matcher. $\Delta N_0$ means the number of bits to be repeated for the systematic bit stream, and $\Delta N_1$ to $\Delta N_i$ mean the number of bits to be repeated for each parity bit steam. The other terms have the meanings defined above.

Referring to FIG. 7, an input bit stream comprised of unit input bits $M_k$ is applied in common to a first constituent encoder 702, and a second constituent encoder 703 through an interleaver 701. The first constituent encoder 702 encodes the input bits $M_k$ at a given code rate and outputs a first TT bit stream along with coded bit streams. For example, if a mother code rate is 1/M, the coded bit streams output from the first constituent encoder 702 include one systematic bit stream $X_k$ and (M−1)/2 parity bit streams $Y_{k,1}$ to $Y_{k,(M-1)/2}$. The second constituent encoder 703 encodes interleaved input bits $X'_k$ provided form the interleaver 701 at a given code rate and outputs a second TT bit stream along with coded bit streams. For example, if a mother code rate is 1/M, the coded bit streams output from the second constituent encoder 703 include one systematic bit stream $X'_k$ and (M−1)/2 parity bit streams $Y_{k,(M+1)/2}$ to $Y_{k,M-1}$. It is general not to output the $X'_k$. However, tail bits for initializing the first constituent encoder 702 and tail bits for initializing the second constituent encoder 703 are output.

If a mother code rate is ⅓, coded bits $X_k$, $Y_{k,1}$ and $Y_{k,2}$ are basically output. Additionally, there exist first tail bits for initializing the first constituent encoder 702, second tail bits for initializing the second constituent encoder 703, first TT bits obtained by encoding the first tail bits by the first constituent encoder 702, and second TT bits obtained by encoding the second tail bits by the second constituent encoder 703. A TT bit stream includes the first and second tail bits and the first and second TT bits. A first TT bit stream includes the first tail bits and the first TT bits, and a second TT bit stream includes the second tail bits and the second TT bits. Here, k is an index indicating the order of a bit signal.

Meanwhile, the total number of bits constituting the first TT bit stream and the second TT bit stream output from the first constituent encoder 702 and the second constituent encoder 703 is defined as (M+1)×L, if the number L of tail bits is determined. Here, the L means the number of tail bits generated by the first constituent encoder 702 and the second constituent encoder 703.

The first TT bit stream and the second TT bit stream are provided to a TT bit distributor 716. The first and second TT bits, during rate matching on the coded bit streams, are used to be multiplexed with coded bits of each of the coded bit streams. A definition and function of the TT bits constituting the first TT bit stream and the second TT bit stream has already been described. The TT bit distributor 716 distributes the first and second TT bits constituting the first and second TT bit streams from the first constituent encoder 702 and the second constituent encoder 703 into TT bit groups, the number of which is identical to the number of coded bit streams from the first constituent encoder 702 and the second constituent encoder 703. The TT bit distributor 716 distributes the TT bits so that TT bit groups for each coded bit stream should have the same number of TT bits. In FIG. 7, as a mother code rate of the first and second constituent encoders 702 and 703 is defined as 1/M, the TT bit distributor 716 distributes TT bits constituting the TT bit streams into M TT bit groups. The M TT bit groups each comprised of a predetermined number of TT bits by the TT bit distributor 716 are provided to M associated multiplexers (MUX) 704 to 708. In FIG. 7, the M TT bit groups are represented by TT bits$^1$, TT bits$^2$, ..., TT bits$^{(M-1)/2}$, TT bits$^{(M+1)/2}$, ..., and TT bits$^{M-1}$, respectively.

Meanwhile, the number of the multiplexes 704 to 708 receiving the outputs of the first constituent encoder 702 and the second constituent encoder 763 and the TT bits in a TT bit group unit from the TT bit distributor 716 is identical to the number of coded bit streams generated by the mother code rate. For example, if the mother code rate is 1/3, the channel encoder 620 must include 3 multiplexers, as 3 coded bit streams including the systematic bit stream and the outputs of the first constituent encoder 702 and the second constituent encoder 703 are generated by the mother code rate. That is, the 3 multiplexers correspond to the systematic bit stream, the output of the first constituent encoder 702 and the output of the second constituent encoder 703, respectively. In FIG. 7, as the mother code rate of the first constituent encoder 702 and the second constituent encoder 703 is 1/M, the channel encoder 620 includes M multiplexers. The multiplexers 704 to 708 each multiplex their input coded bit streams with the TT bits in the TT bit group unit. Among the multiplexers 704 to 708, the multiplexer 704 receiving the systematic bit stream multiplexes the systematic bit stream with the TT bits in the corresponding TT bit group.

The coded bit streams multiplexed with TT bits, output from the multiplexers 704 to 708, are applied to corresponding rate matchers (RM) 709 to 713. That is, the systematic bit stream multiplexed with TT bits$^1$, output from the multiplexer 704, is applied to the rate matcher 709, and the parity bit stream multiplexed with TT bits$^2$, output from the multiplexer 705, is applied to the rate matcher 710. The parity bit stream multiplexed with TT bits$^{(M-1)/2}$, output from the multiplexer 706, is applied to the rate matcher 711. The parity bit stream multiplexed with TT bits$^{(M+1)/2}$, output from the multiplexer 707, is applied to the rate matcher 712. Finally, the parity bit stream multiplexed with TT bits$^{M-1}$, output from the multiplexer 708, is applied to the rate matcher 713.

Therefore, the number of the rate matchers 709 to 713 must be identical to the number of multiplexers 704 to 708. In addition, the rate matchers 709 to 713 are provided with the numbers $\Delta N_0$ to $\Delta N_{M-1}$, assigned thereto, of bits to be punctured or repeated from an upper layer. The sum of the numbers $\Delta N_0$ to $\Delta N_{M-1}$ of bits to be punctured or repeated, provided to the rate matchers 709 to 713, is identical to the total number of bits to be punctured or repeated by channel coding and rate matching. This is expressed by $$\Delta N = \sum_{i=0}^{M-1} \Delta N_i \qquad \text{Equation (3)}$$

Figure 5:
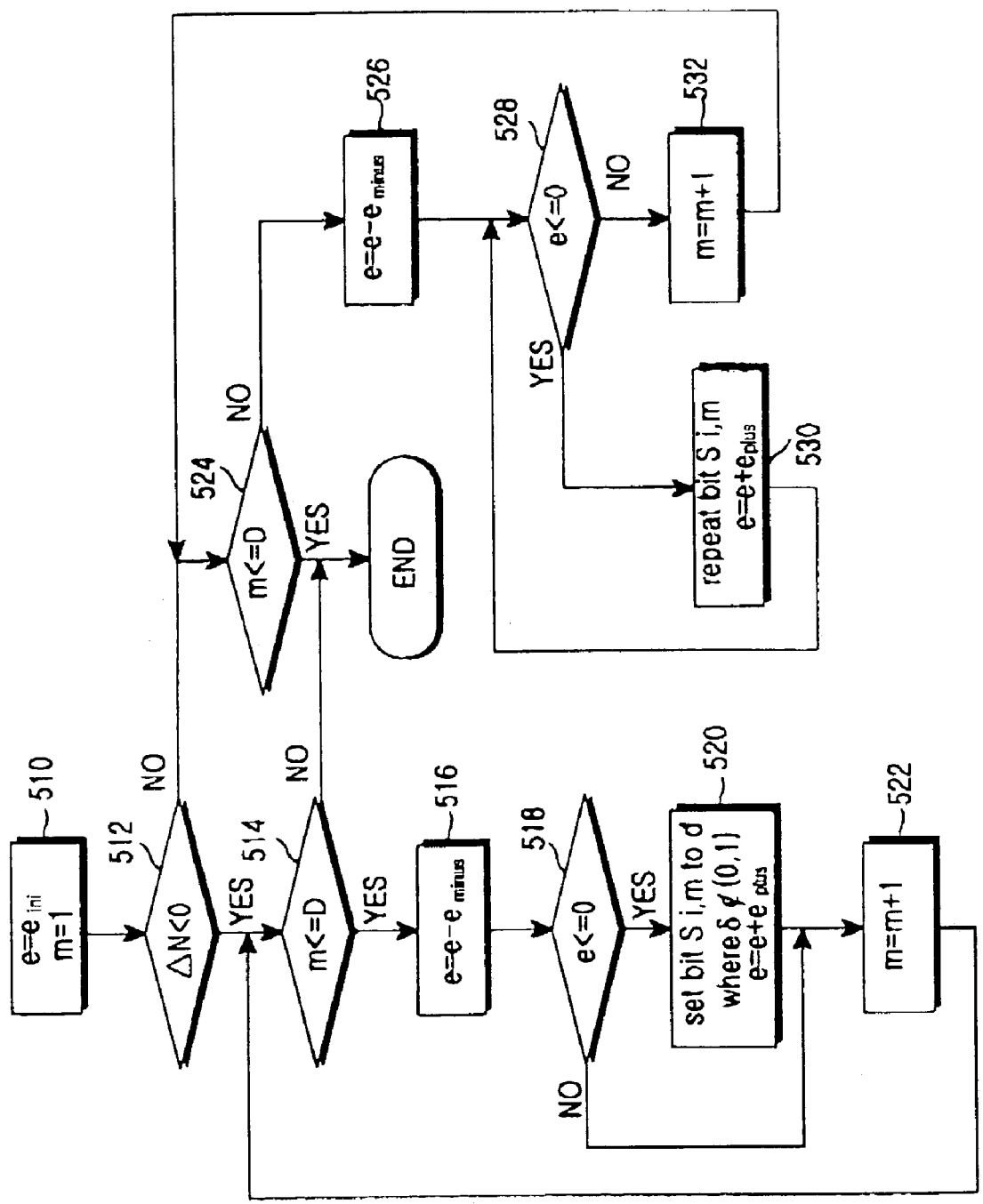
FIG. 5 illustrates a general procedure for performing rate matching.

The rate matchers 710 to 713 determine bits to be repeated or punctured in the coded bit streams from the multiplexers 705 to 708 based on the numbers, assigned thereto, of the bits to be repeated or punctured. Meanwhile, the rate matcher 709 receives the systematic bit stream multiplexed with the TT bits in the first TT bit group, output from the multiplexer 704, and determines systematic bits to be repeated among the systematic bits constituting the systematic bit stream. That is, the multiplexer 709 managing the systematic bits is inactivated during puncturing. This can be expressed by $\Delta N_0=0$ for $\Delta N<0$. $\Delta N<0$ means that puncturing on the coded bits is required. In this case, the rate matcher 709 is inactivated by setting the number $\Delta N_0$ of systematic bits to be repeated to "0." Here, the bits to be repeated or punctured among coded bits in one coded bit stream can be determined by the process described in conjunction with FIG. 5. After determining the coded bits to be repeated or punctured, the rate matchers 709 to 713 provide their coded bit streams to a bit collector or multiplexor (MUX) 714.

The bit collector (or MUX) 714 punctures or repeats the bits determined to be punctured or repeated by the rate matchers 709 to 713, and outputs as many bits as the number of required transmission bits.

The puncturer in the conventional channel encoder 120 and the bit separator 410 in the conventional rate matcher 130 can be excluded, since the encoder/rate matcher 620 of FIG. 7 includes the multiplexers 704 to 708 associated with coded bit streams from the first constituent encoder 702 and the second constituent encoder 703.

Figure 8:
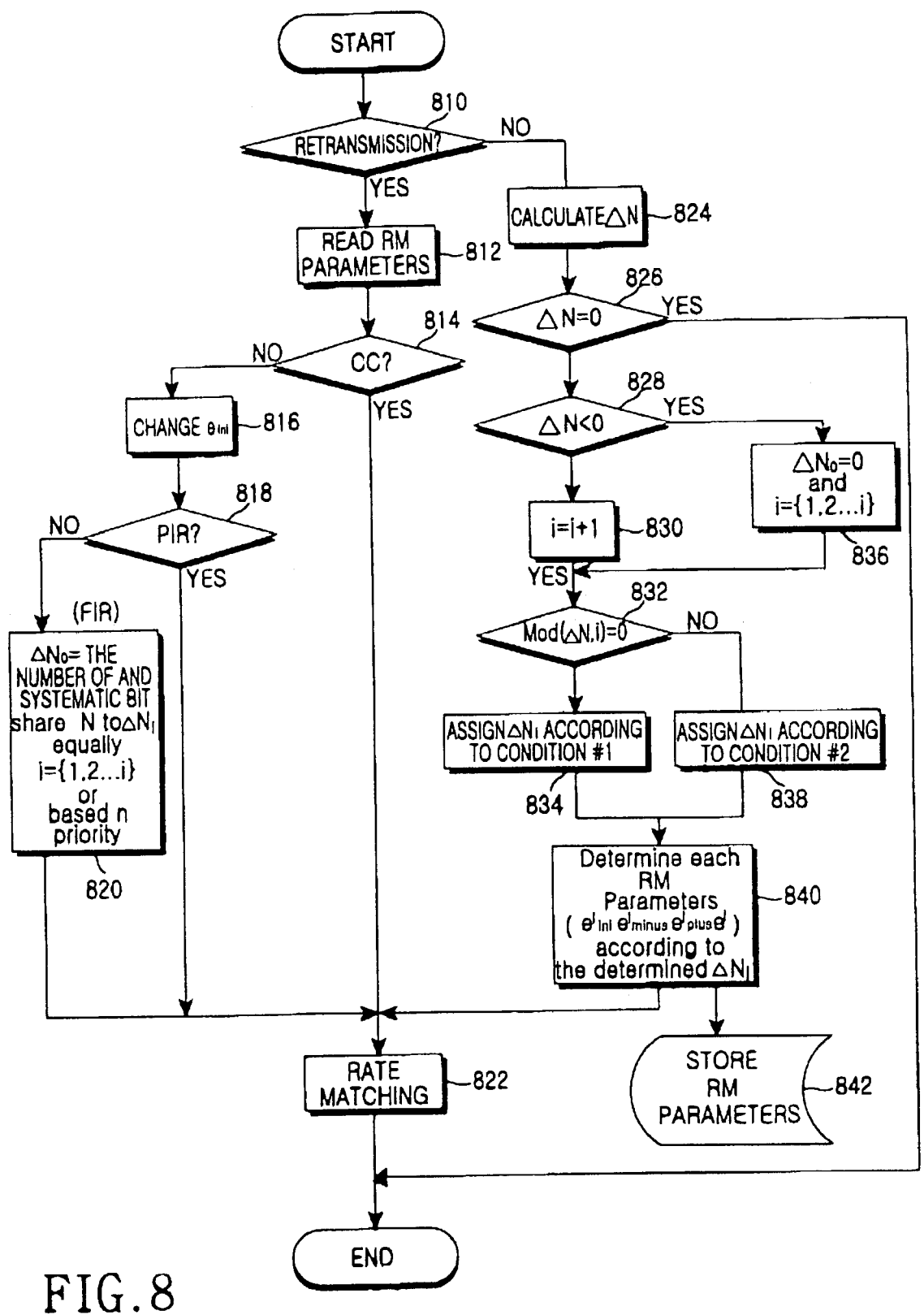
FIG. 8 illustrates a procedure for combined performing of channel coding and rate matching according to an embodiment of the present invention.

FIG. 8 illustrates a procedure for commonly performing channel coding and rate matching in a transmitter for a CDMA mobile communication system according to an embodiment of the present invention. The procedure of FIG. 8 is divided into an operation during initial transmission and an operation during retransmission.

Parameters used in FIG. 8 will be defined as follows. A condition constant k designates the number of rate matchers for performing repetition or puncturing among the rate matchers, and i is a value designating a rate matcher for performing the repetition or puncturing. A range of the parameter i is determined according to whether to perform repetition or puncturing. In the following description, the total number of rate matchers will be represented by M.

Referring to FIG. 8, the encoder/rate matcher 620 determines in step 810 whether current transmission is retransmission. If it is determined in step 810 that the current transmission is retransmission, the encoder/rate matcher 620 performs rate matching through steps 812 to 820. However, if it is determined in step 810 that the current transmission is initial transmission, the encoder/rate matcher 620 performs rate matching through steps 824 to 842. Rate matching occurs after each of the above processes.

First, an operation during initial transmission will be described. In step 824, the encoder/rate matcher 620 calculates the total number $\Delta N$ of bits to be punctured or repeated during initial transmission, based on the total number of transmittable bits and the total number of bits generated when encoding a predetermined number K of input bits at a mother code rate. After calculating the $\Delta N$, the encoder/rate matcher 620 determines in step 826 whether the $\Delta N$ is equal to "0." If the $\Delta N$ is equal to "0," it means that the number of transmittable bits is identical to the number of coded bits, so puncturing or repetition on the coded bits is not required. Therefore, if it is determined in step 826 that $\Delta N$ is equal to "0," the encoder/rate matcher 620 provides the coded bits stream to the interleaver 630 without performing rate matching. However, if it is determined in step 826 that the $\Delta N$ is not equal to "0," the encoder/rate matcher 620 determines in step 828 whether the $\Delta N$ is greater or less than "0." That the $\Delta N$ is less than "0" means that $\Delta N$ bits must be punctured among the coded bits. In contrast, that the $\Delta N$ is greater than "0" means that $\Delta N$ bits among the coded bits must be repeated. Therefore, if it is determined in step 828 that the $\Delta N$ is greater than "0," the encoder/rate matcher 620 proceeds to step 830 to repeat ΔN bits among the coded bits. However, if it is determined in step 828 that the ΔN is less than "0," the encoder/rate matcher 620 proceeds to step 836 to puncture ΔN bits among the coded bits.

In step 830, the encoder/rate matcher 620 sets ranges of k and i such that the number $\Delta N_i$ of bits to be repeated is assigned to each of the M rate matchers, in performing rate matching on the coded bits. Therefore, in step 830, the encoder/rate matcher 620 sets k to the total number M of rate matchers so that the number of bits to be repeated can be assigned to all of the rate matchers, and also sets a range of i to 0≦i≦M−1, i.e., {0,1,2, . . . ,M−1}. However, in step 836, as it is not possible to assign the number of puncturing bits to the rate matcher for managing the systematic bits, the encoder/rate matcher 620 must set ranges of k and i such that the number of bits to be punctured should be assigned to the rate matchers except the rate matcher for managing the systematic bits. Therefore, in step 836, the encoder/rate matcher 620 sets k to M−1, and sets a range of i to 1≦i≦M−1, i.e., {1,2, . . . ,M−1 }. Further, the encoder/rate matcher 620 sets the number $\Delta N_0$ of puncturing bits, provided to the rate matcher for managing the systematic bit stream, to "0." Therefore, when performing step 830, the encoder/rate matcher 620 sets the parameters so that the total number ΔN of bits to be repeated should be distributed into M bit groups. However, when performing the step 836, the encoder/rate matcher 620 sets the parameters so that the total number ΔN of bits to be punctured should be distributed into (M−1) bit groups. That is, during repetition, all rate matchers perform a repetition operation. However, during puncturing, all of the rate matchers except the rate matcher for managing the systematic bit stream perform a puncturing operation.

After setting ranges of k and i for repetition or puncturing through the steps 830 and 836, the encoder/rate matcher 620 performs an operation of assigning $\Delta N_i$. The $\Delta N_i$ indicates the number of bits to be punctured or repeated by the corresponding rate matcher. There are several methods of distributing the total number ΔN of bits to be punctured or repeated to the rate matchers. Herein, the present invention will provide 4 possible methods.

In a first method, the ΔN is a multiple of k, and the coded bits are all assigned the same priority. For example, it is assumed that M=4, ΔN=6 and puncturing is performed. In this case, k=3 and 1≦i≦3. Therefore, the $\Delta N_i$, i.e., $\Delta N_1$, $\Delta N_2$ and $\Delta N_3$ each are assigned $_2$, so that each of the rate matchers except the rate matcher for managing the systematic bit stream punctures 2 bits. However, if it assumed that M=3, ΔN=6 and repetition is performed, then k=3 and 0≦i≦2. Therefore, the $\Delta N_i$, i.e., $\Delta N_0$, $\Delta N_1$, and $\Delta N_2$ each are assigned 2, so that each of the rate matchers repeats 2 bits.

In a second method, the ΔN is a multiple of k, and the coded bits are assigned the different priorities. For example, it is assumed that M=4, ΔN=6 and puncturing is performed. In this case, k=3 and 1≦i≦3. Therefore, $\Delta N_1$ is assigned 3, $\Delta N_2$ is assigned 2, and $\Delta N_3$ is assigned 1. Further, $\Delta N_0$ corresponding to the rate matcher for managing the systematic bit stream is assigned 0. However, if it assumed that M=3, ΔN=6 and repetition is performed, then k=3 and 0≦i≦2. Therefore, $\Delta N_0$ is assigned 3, $\Delta N_1$ is assigned 2, and $\Delta N_2$ is assigned 1. That is, priority of the coded bits managed by the corresponding rate matchers is assigned the different number of bits to be punctured or repeated by the corresponding rage changers. Here, at initial transmission, the systematic bit stream is higher in priority than the parity bits, and at retransmission, previously non-transmitted parity bits are higher in priority than the systematic bit stream.

In a third method, the ΔN is not a multiple of k, and the coded bits are all assigned the same priority. For example, it is assumed that M=4, ΔN=5 and puncturing is performed. In this case, k=3 and 1≦i≦3. Therefore, $\Delta N_1$ is assigned 2, $\Delta N_2$ is assigned 2, and $\Delta N_3$ is assigned 1. Further, $\Delta N_0$ corresponding to the rate matcher for managing the systematic bit stream is assigned 0. However, if it assumed that M=3, ΔN=5 and repetition is performed, then k=3 and 0≦i≦2. Therefore, $\Delta N_0$ is assigned 2, $\Delta N_1$ is assigned 2, and $\Delta N_2$ is assigned 1. In this method, the numbers of bits assigned to the rate matchers corresponding to the case where the ΔN is not a multiple of k, are maintained as similar as possible.

In a fourth method, the ΔN is not a multiple of k, and the coded bits are assigned the different priorities. For example, it is assumed that M=4, ΔN=5 and puncturing is performed. In this case, k=3 and 1≦i≦3. Therefore, $\Delta N_1$ is assigned 3, $\Delta N_2$ is assigned 1, and $\Delta N_3$ is assigned 1. Further, $\Delta N_0$ corresponding to the rate matcher for managing the systematic bit stream is assigned 0. However, if it assumed that M=3, ΔN=5 and repetition is performed, then k=3 and 0≦i≦2. Therefore, $\Delta N_0$ is assigned 3, $\Delta N_1$ is assigned 1, and $\Delta N_2$ is assigned 1. In this method, the systematic bits having higher priority than the parity bits are first processed.

Therefore, in order to assign the $\Delta N_i$ based on the ΔN and the k, one of the four methods is used. Although four methods are illustrated herein, other methods can be envisioned.

A process of performing the above methods will be described with reference to FIG. 8. In step 832, the encoder/rate matcher 620 determines whether the ΔN is a multiple of k. For this, the encoder/rate matcher 620 performs a modulo ΔN operation on k. If the result of the modulo operation is "0," the encoder/rate matcher 620 determines that the ΔN is a multiple of k. Otherwise, if the result of the modulo operation is "1,"the encoder/rate matcher 620 determines that the ΔN is not a multiple of k. If it is determined in step 832 that the ΔN is a multiple of k, the encoder/rate matcher 620 proceeds to step 834 where it assigns the $\Delta N_i$ on a first condition. The first condition is a condition for applying the first method and the second method. Therefore, in step 834, the encoder/rate matcher 620 can assign the $\Delta N_i$ in the first method and the second method. However, if it is determined in step 832 that the ΔN is not a multiple of k, the encoder/rate matcher 620 proceeds to step 838 where it assigns the $\Delta N_i$ on a second condition. The second condition is a condition for applying the third method and the fourth method. Therefore, in step 838, the encoder/rate matcher 620 can assign the $\Delta N_i$ in the third method and the fourth method.

After assigning the $\Delta N_i$ in step 834 or 838, the encoder/rate matcher 620 determines, in step 840, RM parameters according to the determined $\Delta N_i$. The RM parameters include rate matching parameters $e_{ini}$, $e_{minus}$, $e_{plus}$ and $D_i$ required for performing rate matching by the algorithm shown in FIG. 5. The parameter $D_i$ indicates the number of coded bits applied to each rate matcher. The RM parameters are determined depending on the predetermined mother code rate, the channel code rate, and the number of transmission bits. The parameter $e_{ini}$ is a parameter for determining a bit to be initially punctured or repeated, and based on the $e_{plus}$ value and the $e_{minus}$ value, the encoder/rate matcher 620 determines a period at which it will puncture or repeat the coded bits applied to the rate matchers. That is, if the number of bits to be punctured or repeated is 4, the encoder/rate matcher 620 determines the parameters such that the coded bits applied to the rate matchers are punctured or repeated at periods of 4 bits. It is preferable to determine the period as long as possible.

After determining the RM parameters in step 840, the encoder/rate matcher 620 stores the determined parameters in a given buffer in step 842. Thereafter, the encoder/rate matcher 620 proceeds to step 822 where the rate matchers each puncture or repeat as many coded bits as the determined number based on the determined parameters.

Next, an operation during retransmission will be described. In step 812, the encoder/rate matcher 620 reads the RM parameters stored in the buffer in step 842. The RM parameters indicate the parameters stored at initial transmission in step 842. After reading the RM parameters, the encoder/rate matcher 620 determines in step 814 whether to use CC as HARQ. Commonly, the CC is HARQ for transmitting the same coded bits as transmitted at initial transmission, even during retransmission. Therefore, if it is determined in step 814 that the CC is used as the HARQ, the encoder/rate matcher 620 proceeds to step 822 where it performs rate matching based on the read RM parameters. However, if the CC is not supported, the encoder/rate matcher 620 excludes the operation in step 814 and proceeds to step 816.

However, if it is determined in step 814 that the CC is not used as HARQ, it means that IR is used as the HARQ. Therefore, the encoder/rate matcher 620 proceeds to step 816 where it changes the parameter $e_{ini}$ determined at initial transmission. For example, in the case of the IR, the coded bits transmitted are changed at initial transmission and each retransmission. The reason for changing the $e_{ini}$ is to repeat or puncture different coded bits at each transmission by changing the initial value for initial puncturing or repetition. That is, when the $e_{ini}$ is changed, although the number of bits to be punctured or repeated is constant, the positions of the bits to be punctured or repeated are changed. The processor 650 changes $e_{ini}$ value when the retransmission is needed by hybrid automatic retransmission request (HARQ).

After changing the $e_{ini}$, the encoder/rate matcher 620 determines in step 818 whether PIR is used as HARQ. Commonly, the PIR is HARQ for maintaining the systematic bits among the initially transmitted coded bits and changing only the parity bits, during retransmission. To this end, the $\Delta N_0$ must be maintained to 0. Therefore, the $\Delta N_i$ is not changed. For this reason, of all parity bits generated by the mother code rate, parity bits different from the parity bits transmitted at initial transmission are transmitted since the changed $e_{ini}$ is different from the $e_{ini}$ set during initial transmission. In describing the above method with a puncturing pattern, Equation (4) shows an example of performing puncturing at a position shifted by one bit according to the different $e_{ini}$.

$$\begin{bmatrix} 1 & 1 & 1 \\ 0 & 1 & 1 \\ 1 & 0 & 0 \end{bmatrix} \rightarrow \begin{bmatrix} 1 & 1 & 1 \\ 1 & 0 & 1 \\ 0 & 1 & 0 \end{bmatrix} \quad \text{Equation (4)}$$

In Equation (4), the left puncturing pattern was used at previous transmission, and the right puncturing pattern will be used at current retransmission. Compared with the puncturing pattern used at previous transmission, the puncturing pattern to be used at current retransmission has a second row shifted right by one. In addition, the last row is also shifted right by one. That is, changing the $e_{ini}$ is equivalent to changing the puncturing pattern as illustrated in Equation (4).

Therefore, if it is determined in step 818 that the PIR is used as HARQ, the encoder/rate matcher 620 proceeds to step 822 where it performs rate matching based on the read RM parameters and the changed $e_{ini}$. However, if it is determined in step 818 that the PIR is not used as HARQ, the encoder/rate matcher 620 proceeds to step 820 since it means that the FIR is used as HARQ. The FIR is HARQ for transmitting no systematic bit and transmitting only changed parity bits, during retransmission. Therefore, in step 820, in order to prevent the systematic bits from being transmitted, the encoder/rate matcher 620 sets the $\Delta N_0$ to the number of systematic bits. That is, all systematic bits are punctured. In addition, since it is possible to transmit more parity bits, the encoder/rate matcher 620 assigns the $\Delta N_i$ except $\Delta N_0$ using one of the four methods. After assigning the $\Delta N_i$, the encoder/rate matcher 620 determines the parameters based on the assigned $\Delta N_i$ and then proceeds to step 822 to perform rate matching.

As described above, the present invention unites channel coding with rate matching to reduce hardware complexity of a transmitter for a CDMA mobile communication system, thus contributing to a reduction in the cost. In addition, it is possible to rapidly perform channel coding and rate matching on transmission data, thereby reducing a data process delay time at the transmitter.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmitter for use in a mobile communication system including an encoder for encoding a stream of information bits and generating a stream of systematic bits and a plurality of streams of parity bits, and a processor for providing plurality of parameters for rate matching to zero (0) a difference determined by subtracting the total number of the systematic bits and the parity bits generated by the encoder from the total number of bits to be transmitted over a radio channel for the given transmission period, comprising:
   a rate matcher, coupled to the encoder and processor, for if the difference is a negative value, uniformly puncturing bits corresponding to the difference in the streams of the parity bits without puncturing the stream of the systematic bits, and if the difference is a positive value uniformly repeating bits corresponding to the difference in the stream of the systematic bits and the streams of the parity bits; and
   a bit collector for receiving outputs of the rate matcher and outputting one stream of coded bits,
   wherein the transmitter changes at least one of the parameters when the transmitter retransmits the information bits.

2. The transmitter of claim 1, wherein the parameters at least includes $e_{ini}$ determining a first puncturing position of the stream of the parity bits.

3. The transmitter of claim 1, the processor changes $e_{ini}$ value when the transmitter retransmits the information bits by hybrid automatic retransmission request (HARQ).

4. The transmitter of claim 1, wherein the number of bits corresponding to the difference is changed when one of FIR (Full Incremental Redundancy), PIR (Partial Incremental Redundancy) and CC (Chase Combining) is requested for HARQ (Hybrid Automatic Retransmission Request).

5. The transmitter of claim 1, further comprising:
a tail bit distributor for receiving a first tail bit stream and a second tail bit stream generated from the encoder, and uniformly distributing the first tail bit stream and the second tail bit stream to the stream of the systematic bits and the streams of the parity bits.

6. A transmitter for use in a mobile communication system including an encoder for encoding a stream of information bits and generating a stream of systematic bits and a plurality of streams of parity bits, and a processor for providing plurality of parameters for rate matching to zero (0) a difference determined by subtracting the total number of the systematic bits and the parity bits generated by the encoder from the total number of bits to be transmitted over a radio channel for the given transmission period, comprising:
a rate matcher, coupled to the encoder and processor, for if the difference is a negative value, non-uniformly puncturing bits corresponding to the difference in the streams of the parity bits without puncturing the stream of the systematic bits, and if the difference is a positive value, non-uniformly repeating bits corresponding to the difference in the stream of the systematic bits and the streams of the parity bits; and
a bit collector for receiving outputs of the rate matcher and outputting one stream of coded bits,
wherein the transmitter changes at least one of the parameters when the transmitter retransmits the information bits.

7. The transmitter of claim 6, wherein the parameters at least includes $e_{ini}$ determining a first puncturing position of the stream of the parity bits.

8. The transmitter of claim 7, the processor changes $e_{ini}$ value when the transmitter retransmits the information bits by hybrid automatic retransmission request (HARQ).

9. The transmitter of claim 6, wherein the number of bits corresponding to the difference is changed when one of FIR (Full Incremental Redundancy), PIR (Partial Incremental Redundancy) and CC (Chase Combining) is requested for HARQ (Hybrid Automatic Retransmission Request).

10. The transmitter of claim 6, further comprising:
a tail bit distributor for receiving a first tail bit stream and a second tail bit stream generated from the encoder, and uniformly distributing the first tail bit stream and the second tail bit stream to the stream of the systematic bits and the streams of the parity bits.

11. The transmitter of claim 10, wherein the number of bits corresponding to the difference are non-uniformly punctured according to priority of the streams of the parity bits or non-uniformly repeated according to priority of the stream of the systematic bits and the streams of the parity bits.

12. A transmission method in a mobile communication system including an encoder for encoding a stream of information bits and generating a stream of systematic bits and a plurality of streams of parity bits, comprising the steps of:
if the total number of the systematic bits and the parity bits generated by the encoder is greater than the total number of bits to be transmitted over a radio channel for the given transmission period, puncturing each of the streams of the parity bits by a almost equal number of bits without puncturing the stream of the systematic bits based on at least one of a plurality of parameters, thereby puncturing as many bits as the difference between the total number of the systematic bits and the parity bits and the total number of bits to be transmitted over a radio channel;
if the total number of the systematic bits and the parity bits generated by the encoder is less than the total number of bits to be transmitted over a radio channel for the given transmission period, repeating the stream of the systematic bits and the streams of the parity bits by the almost equal number of bits based on at least one of the plurality of parameters, thereby repeating as many bits as the difference between the total number of the systematic bits and the parity bits and the total number of bits to be transmitted over a radio channel; and
bit collecting to receive the punctured or repeated streams and output one stream of coded bits,
wherein at least one of the plurality of parameters is changed when a retransmission of the information bits occurs.

13. The transmission method of claim 12, wherein the parameters at least includes $e_{ini}$ determining a first puncturing position of the stream of the parity bits.

14. The transmission method of claim 13, the $e_{ini}$ value is changed when the information bits is retransmitted by hybrid automatic retransmission request (HARQ).

15. The transmission method of claim 12, wherein the number of bits corresponding to the difference is changed when one of FIR (Full Incremental Redundancy), PIR (Partial Incremental Redundancy) or and CC (Chase Combining) is requested for HARQ (Hybrid Automatic Retransmission Request).

16. The transmission method of claim 12, further comprising the steps of:
receiving a first tail bits and a second tail bits generated from the encoder, and equally distributing the first tail bits and the second tail bits to the stream of the systematic bits and the streams of the parity bits.

17. A transmission method in a mobile communication system including an encoder for encoding a stream of information bits and generating the stream of systematic bits and a plurality of streams of parity bits, comprising the steps of:
if the total number of the systematic bits and the parity bits generated by the encoder is more than the total number of bits to be transmitted over a radio channel for the given transmission period, puncturing the streams of the parity bits by a non-equal number of bits without puncturing the stream of the systematic bits based on at least one of a plurality of parameters, thereby puncturing as many bits as the difference between the total number of the systematic bits and the total number of bits to be transmitted over a radio channel;
if the total number of the systematic bits and the parity bits generated by the encoder is less than the total number of bits to be transmitted over a radio channel for the given transmission period, repeating the stream of the systematic bits and the streams of the parity bits by the non-equal number of bits based on at least one of a plurality of parameters, thereby repeating as many bits as the difference between the total number of the systematic bits and the total number of bits to be transmitted over a radio channel; and
bit collecting to receive the punctured or repeated streams and output one stream of coded bits, wherein at least one of the plurality of parameters is changed when a retransmission of the information bits occurs.

18. The transmission method of claim 17, wherein the number of bits corresponding to the difference is changed when one of FIR (Full Incremental Redundancy), PIR (Partial Incremental Redundancy) and CC (Chase Combining) is requested for HARQ (Hybrid Automatic Retransmission Request).

19. The transmission method of claim 17, further comprising the steps of:
receiving a first tail bits and a second tail bits generated from the encoder, and equally distributing the first tail bits and the second tail bits the stream of the systematic bits and the streams of the parity bits.

20. The transmission method of claim 17, further comprising the step of outputting one stream of coded bits.

21. The transmission method of claim 17, wherein the number of bits corresponding to the difference are asymmetrically punctured according to priority of the streams of the parity bits or asymmetrically repeated according to priority of the stream of the systematic bits and the streams of the parity bits.

22. A transmitter for use in a mobile communication system including an encoder for encoding a stream of information bits to generating a stream of systematic bits and a plurality of streams of parity bits as a coded bits, the transmitter comprising:
a processor for providing plurality of parameters for rate matching to zero (0) a difference determined by subtracting the total number of the systematic bits and the parity bits generated by the encoder from the total number of bits to be transmitted over a radio channel for the given transmission period;
a rate matcher, coupled to the encoder and the processor, for if the difference is a negative value, puncturing almost equal number of bits corresponding to the difference in the each streams of the parity bits without puncturing the stream of the systematic bits based on the parameters; and
a bit collector for receiving outputs of the rate matcher and outputting one stream of coded bits,
wherein the transmitter changes at least one of the plurality of parameters when the transmitter retransmits the information bits.

23. The transmitter of claim 22, wherein the parameters at least includes $e_{ini}$ determining a first puncturing position of the stream of the parity bits.

24. The transmitter of claim 23, the processor changes $e_{ini}$ value when the transmitter retransmits the information bits by hybrid automatic retransmission request (HARQ).

25. A method for data transmission in a mobile communication system, the method comprising steps of:
encoding an input bit stream to generate an encoded bit stream, where the encoded bit stream comprisies at least one of a systematic bit stream, a first parity bit stream and a second parity bit stream;
separating the encoded bit stream into the systematic bit stream, the first parity bit stream and the second parity bit stream and inputting the systematic bit streams, the first parity bit stream and the second parity bit stream to respective rate matching function;
rate matching the systematic bit streams, the first parity bit stream and the second parity bit stream according to rate matching parameters; and
bit collecting rate matched systematic bits and rate matched first and second parity bits to generate a data packet,
wherein at least one parameter of the rate matching parameters is changed depending on a redundancy parameter.

26. The method of claim 25, wherein the redundancy parameter comprises at least information indicating a priority between the systematic bits and the parity bits.

27. The method of claim 26, wherein, at initial transmission, the systematic bits are higher in priority than the parity bits.

28. The method of claim 26, wherein, at retransmission, previously non-transmitted parity bits are higher in priority than the systematic bits.

29. The method of claim 25, wherein the at least one parameter is an initial error variable $e_{ini}$.

30. A transmitter for data transmission in a mobile communication system, the transmitter comprising:
a processor for determining a plurality of rate matching parameters;
an encoder for encoding an input bit stream to generate an encoded bit stream, where the encoded bit stream comprises at least one of a systematic bit stream, a first parity bit stream and a second parity bit stream;
a rate matcher for separately receiving the systematic bit stream, the first parity bit stream and the second parity bit stream in respective rate matching functions, and rate matching the systematic bit stream, the first parity bit stream and the second parity bit stream according to the rate matching parameters; and
a bit collector for bit collecting rate matched systematic bits, rate matched first parity bits and rate matched second parity bits to generate a data packet,
wherein the processor changes at least one parameter of the rate matching parameters depending on a redundancy parameter.

31. The transmitter of claim 30, wherein the redundancy parameter comprises at least information indicating a priority between the systematic bits and the parity bits.

32. The transmitter of claim 31, wherein the processor prioritizes, at initial transmission, the systematic bits are higher in priority than the parity bits.

33. The transmitter of claim 31, wherein the processor prioritizes, at retransmission, previously non-transmitted parity bits are at a higher priority than the systematic bits.

34. The transmitter of claim 30, wherein the at least one parameter is an initial error variable $e_{ini}$.

* * * * *